(12) United States Patent
Jeon et al.

(10) Patent No.: US 10,740,443 B2
(45) Date of Patent: Aug. 11, 2020

(54) SYSTEM AND METHOD FOR CODE OBFUSCATION OF APPLICATION

(71) Applicant: LINE Corporation, Shinjuku-Ku, Tokyo (JP)

(72) Inventors: SangHun Jeon, Seongnam-si (KR); Dongpil Seo, Seongnam-si (KR); Sungbeom Ahn, Seongnam-si (KR); Kwang-Hee Han, Seongnam-si (KR); Wang Jin Oh, Seongnam-si (KR); Seong Yeol Lim, Seongnam-si (KR)

(73) Assignee: Line Corporation, Tokyo (JP)

( * ) Notice: Subject to any disclaimer, the term of this patent is extended or adjusted under 35 U.S.C. 154(b) by 255 days.

(21) Appl. No.: 15/887,310

(22) Filed: Feb. 2, 2018

(65) Prior Publication Data

US 2018/0157808 A1 Jun. 7, 2018

Related U.S. Application Data

(63) Continuation of application No. PCT/KR2016/008588, filed on Aug. 4, 2016.

(30) Foreign Application Priority Data

Aug. 10, 2015 (KR) .................. 10-2015-0112741

(51) Int. Cl.
*H04L 29/00* (2006.01)
*G06F 21/14* (2013.01)
(Continued)

(52) U.S. Cl.
CPC .............. *G06F 21/14* (2013.01); *G06F 8/41* (2013.01); *G06F 21/12* (2013.01); *G06F 21/125* (2013.01); *G06F 21/62* (2013.01); *G06F 21/64* (2013.01)

(58) Field of Classification Search
CPC ........ G06F 8/41; G06F 9/45516; G06F 8/447; G06F 8/48; G06F 11/3624
See application file for complete search history.

(56) References Cited

U.S. PATENT DOCUMENTS

| | | | |
|---|---|---|---|
| 8,892,876 B1 * | 11/2014 | Huang | G06F 21/6209 713/165 |
| 2014/0245271 A1 * | 8/2014 | Miller | G06F 8/423 717/146 |
| 2015/0095656 A1 | 4/2015 | Yi et al. | |

FOREIGN PATENT DOCUMENTS

| | | |
|---|---|---|
| JP | 2013-511077 A | 3/2013 |
| KR | 20070067953 A | 6/2007 |

(Continued)

OTHER PUBLICATIONS

Piao, Yuxue, "Server-based Bytecode Obfuscation Scheme for Application Tamper Detection on Android", Graduate of School of Soongsil University, Master's Thesis of Computer Science, Jun. 2013. pp. 30-31.

(Continued)

*Primary Examiner* — Ghazal B Shehni

(74) *Attorney, Agent, or Firm* — Harness, Dickey & Pierce, P.L.C.

(57) ABSTRACT

Provided is a method and system for code obfuscation of an application. A method configured as a computer may include receiving an application program package that includes an intermediate language (IL) code generated by compiling code for an application including a plurality of classes and a plurality of methods as a dex file over a network, selecting a protection target class or a protection target method from among the plurality of classes and the plurality of methods, encrypting the selected protection target class or the selected protection target method by retrieving and encrypting an IL code corresponding to the selected protection target class or the selected protection target method from the dex file, and adding decryption information for decrypting the encrypted protection target class or the encrypted protection target method to a secure module that is further included in the application program package.

19 Claims, 10 Drawing Sheets

(51) Int. Cl.
  *G06F 21/62* (2013.01)
  *G06F 21/12* (2013.01)
  *G06F 8/41* (2018.01)
  *G06F 21/64* (2013.01)

(56) References Cited

FOREIGN PATENT DOCUMENTS

| KR | 1020140029562 | 3/2014 |
| KR | 1020140114769 | 9/2014 |
| KR | 1020140139392 | 12/2014 |
| WO | WO-2007/011001 A1 | 1/2007 |
| WO | WO-2014134080 A1 | 9/2014 |

OTHER PUBLICATIONS

International Search Report PCT/ISA/210 for International Application No. PCT/KR2016/008588 dated Nov. 7, 2016.
Written Opinion of the International Searching Authority PCT/ISA/237 for International Application No. PCT/KR2016/008588 dated Nov. 7, 2016.
Korean Office Action dated Sep. 21, 2016 for corresponding Korean Application No. 10-2015-0112741.
Japanese Office Action dated Apr. 21, 2020 for corresponding Japanese Application No. 2018-506542.

* cited by examiner

SYSTEM AND METHOD FOR CODE OBFUSCATION OF APPLICATION

CROSS-REFERENCE TO RELATED APPLICATION(S)

This U.S. non-provisional application is a continuation of, and claims the benefit of priority under 35 U.S.C. § 365(c) to PCT International Application No. PCT/KR2016/008588, which has an International filing date of Aug. 4, 2016, which claims the benefit of priority to Korean Patent Application No. 10-2015-0112741, filed on Aug. 10, 2015, in the Korean Intellectual Property Office (KIPO), the entire contents of both of which are incorporated herein by reference.

BACKGROUND

Field

One or more example embodiments relate to a system, apparatus, non-transitory computer readable medium, and/or method for code obfuscation of an application.

Description of Related Art

An intermediate language or InterLanguage (IL) refers to a language that goes through an intermediate stage of a process of generating a target language program by translating a source language program using a compiler. For example, if a machine language program is generated by converting a high-level language program to an assembly language, and then by assembling the assembly language into machine language code (e.g., machine code, or machine readable code), the assembly language may be considered the intermediate language.

According to the related art, an IL conversion apparatus and method for a mobile platform includes a C/C++ compiler configured to convert a mobile platform source code developed with a C or C++ language to an IL code required at an interpreter of a mobile communication terminal, and an IL assembler configured to convert the IL code to a format executed at the interpreter of the mobile communication terminal.

However, code of an application that goes through conversion to the IL is vulnerable to decompiling due to one or more characteristics of the code (e.g., code characteristics). For example, code of an application written in a programming language, such as Java, needs to go through conversion (e.g., compilation or interpretation, etc.) into an IL, and thus, the intermediate code is vulnerable to decompiling. Accordingly, important code is easily exposed and is also vulnerable to code manipulation. As a more specific example, code written in Java is generally compiled to a file with an extension ".class" for each class of the application. On Android, code written in Java is compiled to a dex file including a header and data, such as "classes.dex". Here, the dex file is bytecode that is a binary code compiled from an IL code in which a Java code is compiled. Once a Java program is converted into bytecode, the bytecode may be transmitted as a compiled format of the Java program over a network and executed by a Java virtual machine.

Files that have been compiled in a form of an IL code may be provided, for example, from a server to an electronic device and may be executed on a virtual machine supported by the electronic device. Accordingly, the electronic device may acquire and correct (e.g., manipulate, change, modify, etc.) the original code by decompiling the compiled files based on a characteristic of an IL and may compile again (e.g., recompile) the corrected code to the files that are compiled in the form of IL codes. Accordingly, the application may be forged.

SUMMARY

One or more example embodiments provide a system, apparatus, non-transitory computer readable medium, and/or method that may prevent forgery of an application through decompiling by selecting and encrypting code corresponding to a primary class and method from among codes of the application and by decrypting the encrypted code in a runtime.

According to an aspect of at least one example embodiment, there is provided a method executed using at least one computer, the method including receiving, using at least one processor, an application program package over a network, the application program package including intermediate language (IL) code generated by compiling code for an application as a dex file, the application including a plurality of classes and a plurality of methods, selecting, using the at least one processor, at least one protection target class or at least one protection target method from the plurality of classes and the plurality of methods, encrypting, using the at least one processor, the selected protection target class or the selected protection target method, the encrypting including retrieving and encrypting IL code corresponding to the selected protection target class or the selected protection target method from the dex file, and adding, using the at least one processor, decryption information to a secure module that is further included in the application program package, the decryption information for decrypting the encrypted protection target class or the encrypted protection target method.

The receiving may include receiving selection information for designating a class or a method over the network, and the selecting may include selecting the class or the method designated using the received selection information as the protection target class or the protection target method.

The selecting may include retrieving a class or a method corresponding to a desired function of the application from among the plurality of classes and the plurality of methods, and selecting the retrieved class or the retrieved method as the protection target class or the protection target method.

The desired function may include at least one of a billing function at a service provided through the application, an authentication function at the service, and a communication function with a server providing the service.

The dex file may include a header that stores a number indicating a total number of classes included in the plurality of classes, and an offset of a class table, each of the classes of the plurality of classes may include an address offset of a method table with respect to a method included in each of the classes of the plurality of classes, and the encrypting may include retrieving IL code corresponding to the protection target class using the class table, or retrieving IL code corresponding to the protection target method using the method table.

The method may also include selecting, using the at least one processor, the decryption information based on a runtime scheme at an electronic device on which the application program package is to be installed, and the adding may include adding the decryption information to the secure module of the application program package, or generating a plurality of different application program packages using difference pieces of decryption information each corresponding to a plurality of runtime schemes, and adding each of the different pieces of decryption information to a corresponding secure module of the generated plurality of different application program packages.

The decryption information may include information associated with an address offset of the encrypted IL code, a size of the encrypted IL code, and a key used for encryption for a case in which an electronic device executes the application using Dalvik runtime.

The encrypted protection target method may be decrypted at the electronic device by loading the encrypted IL code included in the dex file to a memory of the electronic device, locating the encrypted protection target method in the encrypted IL code based on the address offset of the encrypted IL code included in a dex header of the dex file, decrypting code corresponding to a size of the encrypted IL code corresponding to the encrypted protection target method using the key, and overwriting the decrypted code on the dex header.

The decryption information may include the dex file, and the dex file may include (1) a class including the encrypted protection target method or a class index of the encrypted protection target method, (2) a method index of the encrypted protection target method, and (3) the protection target class or the protection target method for a case in which an electronic device executes the application using Android runtime (ART).

The encrypted protection target method may be decrypted at the electronic device by compiling the dex file included in the decryption information using a converter, by acquiring a native code of the protection target class or the protection target method, by retrieving the encrypted IL code using the class index and the method index from a header of the dex file loaded to a memory of the electronic device, and by overwriting a native code corresponding to the encrypted IL code among the acquired native codes on the retrieved encrypted IL code.

The method may further include updating a cyclic redundancy check (CRC) and a hash value of the dex file changed in response to encrypting the IL code.

The method may further include transmitting, to an electronic device, the application program package in which the IL code is encrypted and the decryption information is added in response to a request from the electronic device over the network.

According to an aspect of at least one example embodiment, there is provided a method executed using at least one computer, the method including receiving, using at least one processor, from a server over a network, an application program package that includes intermediate language (IL) code generated by compiling code for an application as a dex file and decryption information included in a secure module, the IL code including a plurality of classes and a plurality of methods and in which at least a portion of the IL code is encrypted, and the decrypted information is for decrypting the encrypted IL code, decrypting, using the at least one processor, the encrypted IL code using the decryption information or by replacing the encrypted IL code with an IL code included in the decryption information, and executing the decrypted IL code based on a runtime scheme applicable during an execution process of the application, wherein the encrypted IL code is generated by encrypting an IL code of a protection target class or a protection target method selected at the server from among the plurality of classes and the plurality of methods of the application.

According to an aspect of at least one example embodiment, there is provided a system of at least one server including one or more processors. Each of the one or more processors is configured to execute computer readable instructions to, receive an application program package over a network, the application program package including intermediate language (IL) code generated by compiling code for an application as a dex file, the application including a plurality of classes and a plurality of methods, select at least one protection target class or at least one protection target method from the plurality of classes and the plurality of methods, encrypt the selected protection target class or the selected protection target method, the encrypting including retrieving and encrypting IL code corresponding to the selected protection target class or the selected protection target method from the dex file, and add decryption information to a secure module that is further included in the application program package, the decryption information for decrypting the encrypted protection target class or the encrypted protection target method.

According to at least one example embodiment, it is possible to reduce and/or prevent forgery of an application through decompiling by selecting and encrypting code corresponding to a primary class and method from among codes of the application and by decrypting the encrypted code at runtime.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Various example embodiments will be described in more detail with regard to the figures, wherein like reference numerals refer to like parts throughout the various figures unless otherwise specified, and wherein.

Figure 1:
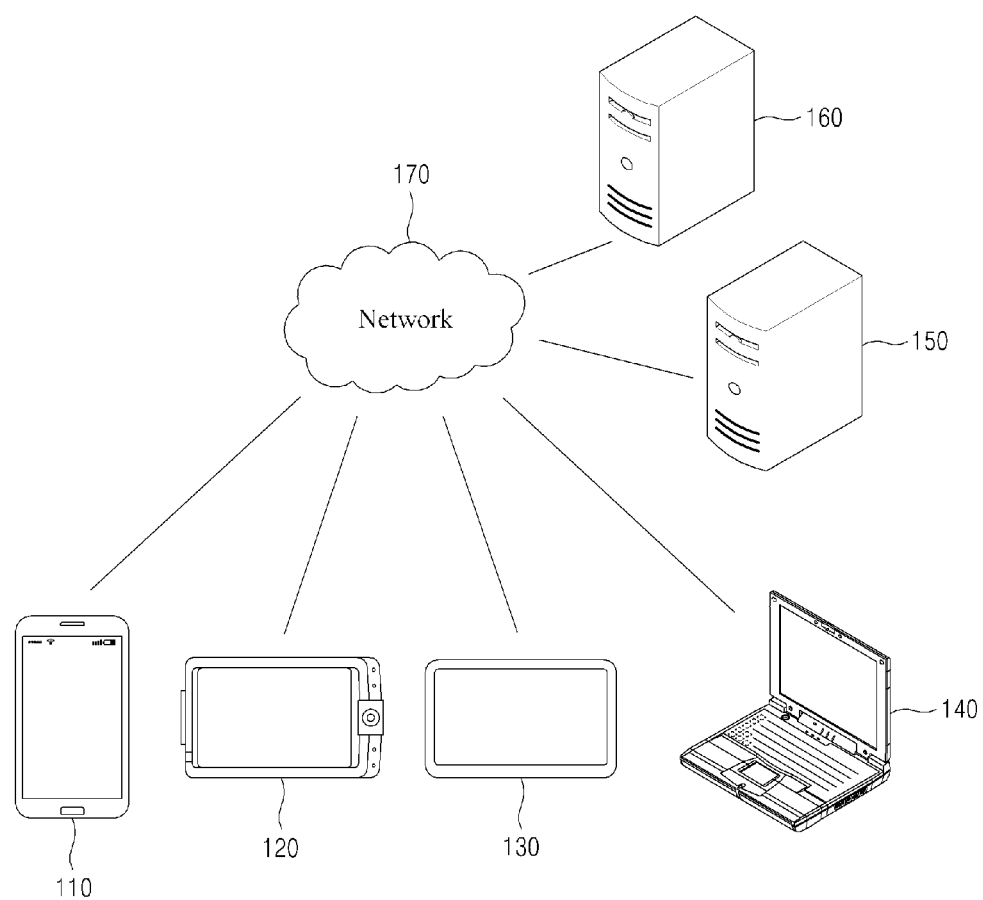
FIG. 1 is a diagram illustrating an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be illustrated as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors, cloud processing, distributed processing, etc.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

A support system according to example embodiments may be configured through an electronic device and/or a serve to be described in the following, and a support method according to example embodiments may be performed by the electronic device or the server. For example, the electronic device may perform the support method for the electronic device under control of an application executed on the electronic device. A computer program, such as the application, may be stored in a non-transitory computer-readable storage medium to perform the support method in conjunction with the electronic device. As another example, the server that provides a messaging service and manages a social network between users through the messaging service may perform the support method.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170, but is not limited thereto. FIG. 1 is provided as an example only and thus, a number of electronic devices and/or a number of servers are not limited thereto.

Each of the plurality of electronic devices 110, 120, 130, and 140 may be a fixed terminal or a mobile terminal configured as a computing system. For example, the plurality of electronic devices 110, 120, 130, and 140 may be a smartphone, a mobile phone, a personal navigation device, a computer, a laptop computer, a digital broadcasting terminal, a personal digital assistant (PDA), a portable multimedia player (PMP), a tablet personal computer (PC), a gaming console, a wearable device, an Internet of Things (IOT) device, a virtual reality device, an augmented reality device, and the like. For example, the electronic device 110 may communicate with other electronic devices 120, 130, and/or 140, and/or the servers 150 and/or 160 over the network 170 in a wired communication manner and/or in a wireless communication manner.

The communication scheme is not particularly limited and may include a communication method that uses a near field communication between devices as well as a communication method using a communication network, for example, a mobile communication network, the wired Internet, the wireless Internet, a broadcasting network, a satellite network, etc., which may be included in the network 170. For example, the network 170 may include at least one of network topologies that include networks, for example, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, it is only an example and the example embodiments are not limited thereto.

Each of the servers 150 and 160 may be configured as an apparatus or a plurality of apparatuses that provides instructions, codes, files, contents, services, and the like through communication with the plurality of electronic devices 110, 120, 130, and/or 140 over the network 170.

For example, the server 150 may provide a file for installing an application to the electronic device 110 connected through the network 170. In this case, the electronic device 110 may install the application using the provided file. Also, the electronic device 110 may access the server 160 under control of at least one program, for example, browser or the installed application, or an operating system (OS) included in the electronic device 110, and may use a service or content provided from the server 160. For example, when the electronic device 110 transmits a service request message to the server 160 through the network 170 under control of the application, the server 160 may transmit code corresponding to the service request message to the electronic device 110 and the electronic device 110 may provide content to a user by configuring and displaying a screen according to the code under control of the application.

Figure 2:
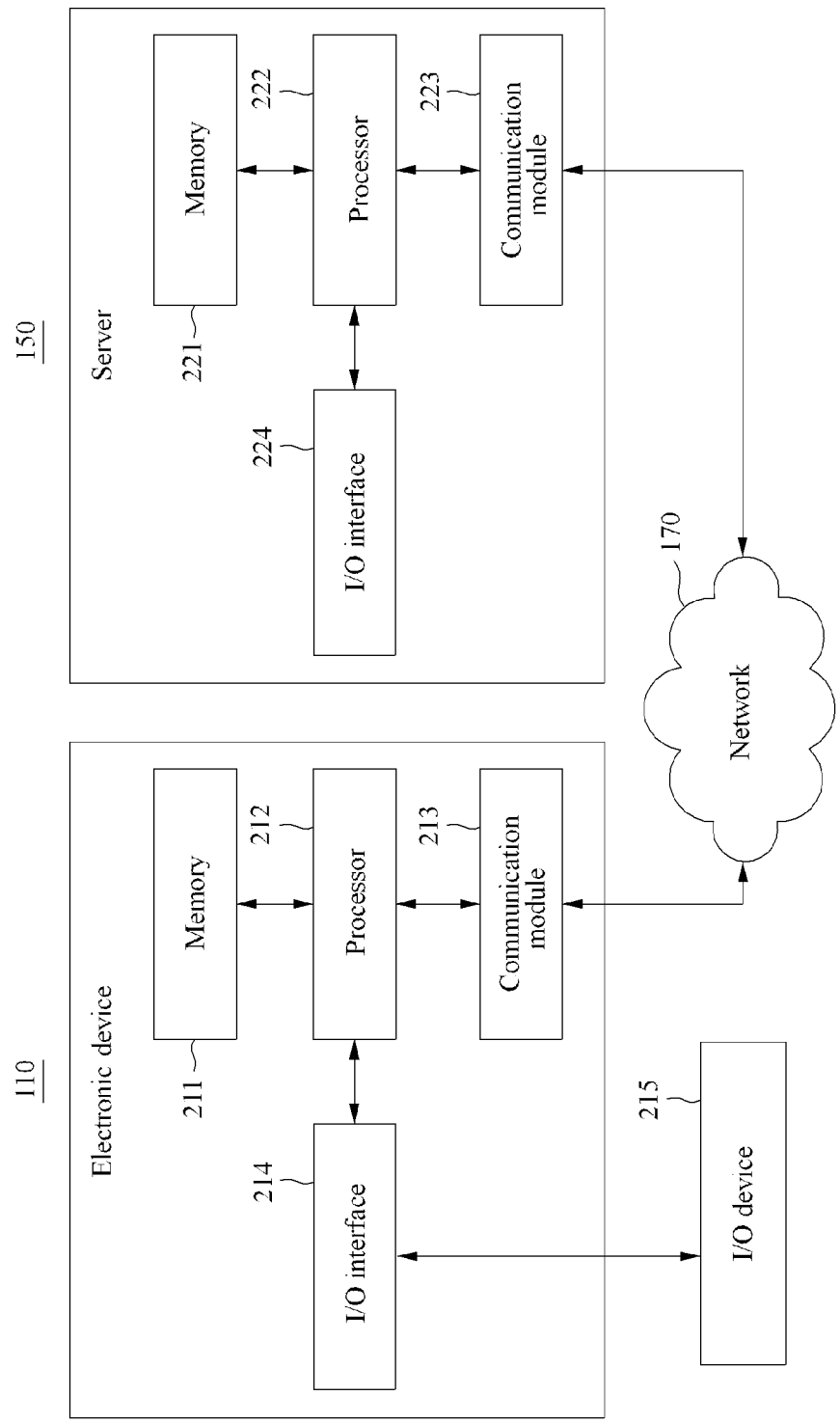
FIG. 2 is a block diagram illustrating an example of a configuration of an electronic device and a server according to at least one example embodiment.

FIG. 2 is a block diagram illustrating an example of a configuration of an electronic device and a server according to at least one example embodiment. FIG. 2 illustrates a configuration of the electronic device 110 as an example for a single electronic device and illustrates a configuration of the server 150 as an example for a single server, however the example embodiments are not limited thereto.

Referring to FIG. 2, the electronic device 110 may include a memory 211, a processor 212, a communication module 213, and an input/output (I/O) interface 214, and the server 150 may include a memory 221, at least one processor 222, a communication module 223, and/or an I/O interface 224, but is not limited thereto. The memory 211, 221 may include a permanent mass storage device, such as random access memory (RAM), read only memory (ROM), a disk drive, a solid state drive, a flash memory, etc., as a non-transitory computer-readable storage medium. Also, an OS and at least one program code, for example, code for a browser installed and executed on the electronic device 110 or the application, etc., may be stored in the memory 211, 221. Such software components may be loaded from another non-transitory computer-readable storage medium separate from the memory 211, 221 using a drive mechanism. The other non-transitory computer-readable storage medium may include, for example, a floppy drive, a disk, a tape, a DVD/CD-ROM drive, a memory card, etc. According to other example embodiments, software components may be loaded to the memory 211, 221 through the communication module 213, 223, instead of, or in addition to, the non-transitory computer-readable storage medium. For example, at least one program may be loaded to the memory 211, 221 based on a program, for example, the application, installed by files provided over the network 170 from developers or a file distribution system, for example, the server 150, which provides an installation file of the application.

The at least one processor 212, 222 may be configured to process computer-readable instructions of a computer program by performing basic arithmetic operations, logic operations, and I/O operations. According to at least one example embodiment, the processor 212, 222 may be a single processor, a multi-core processor, a multi-processor system, a distributed processing system, a cloud computing system, etc. The computer-readable instructions may be provided from the memory 211, 221 and/or the communication module 213, 223 to the at least one processor 212, 222. For example, the at least one processor 212, 222 may be configured to execute received instructions in response to the program code stored in the storage device, such as the memory 211, 222.

The communication module 213, 223 may provide a function for communication between the electronic device 110 and the server 150 over the network 170, and may provide a function for communication between the electronic device 110 and/or the server 150 and another electronic device, for example, the electronic device 120 or another server, for example, the server 160. For example, the processor 212 of the electronic device 110 may transfer a request, for example, a streaming service request for the content, created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the processor 212 or the memory 211, and content, a file, etc., may be stored in a storage medium further includable in the electronic device 110.

The I/O interface 214, 224 may be a device used for interface with an I/O device 215. For example, an input device may include a keyboard, a mouse, a microphone, a camera, etc., and an output device may include a device, such as a display, for displaying a communication session of the application. As another example, the I/O interface 214 may be a device for interface with an apparatus in which an input function and an output function are integrated into a single function, such as a touch screen. In detail, when processing instructions of the computer program loaded to the memory 211, the processor 212 of the electronic device 110 may display a service screen configured using data provided from the server 150 or the electronic device 120, or may display content on a display through the I/O interface 214.

According to other example embodiments, the electronic device 110 and the server 150 may include a greater or lesser number of components than a number of components shown in FIG. 2. However, there is no need to clearly illustrate many components according to the related art. For example, the electronic device 110 may include at least a portion of the I/O device 215, or may further include other components, for example, a transceiver, a global positioning system (GPS) module, a camera, a microphone, a variety of sensors, a database, and the like.

Figure 3:
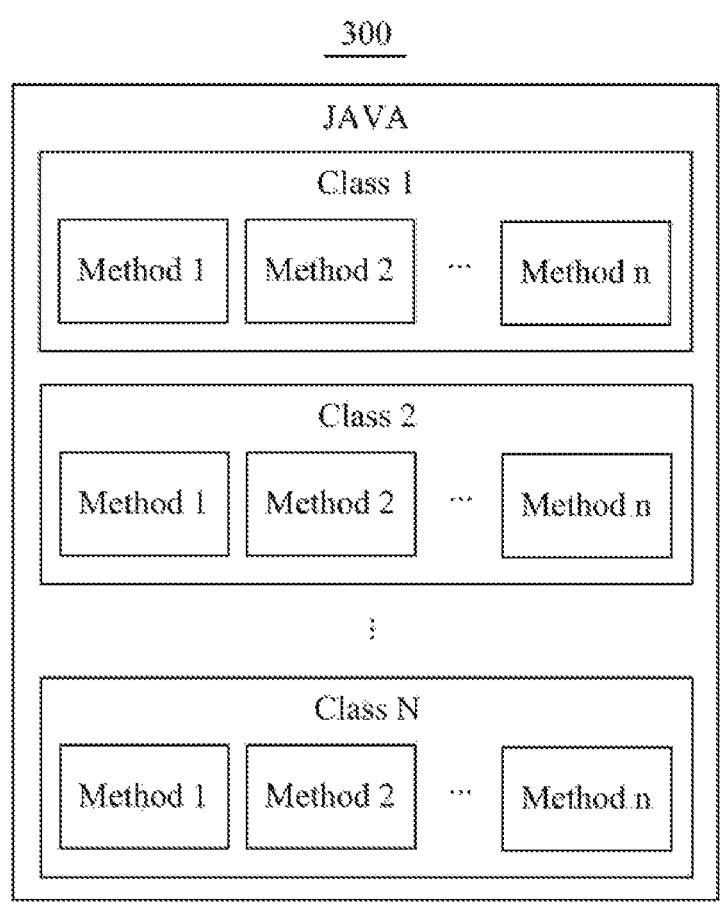
FIG. 3 illustrates an example of a format of a dex file including classes and methods according to at least one example embodiment.
Figure 4:
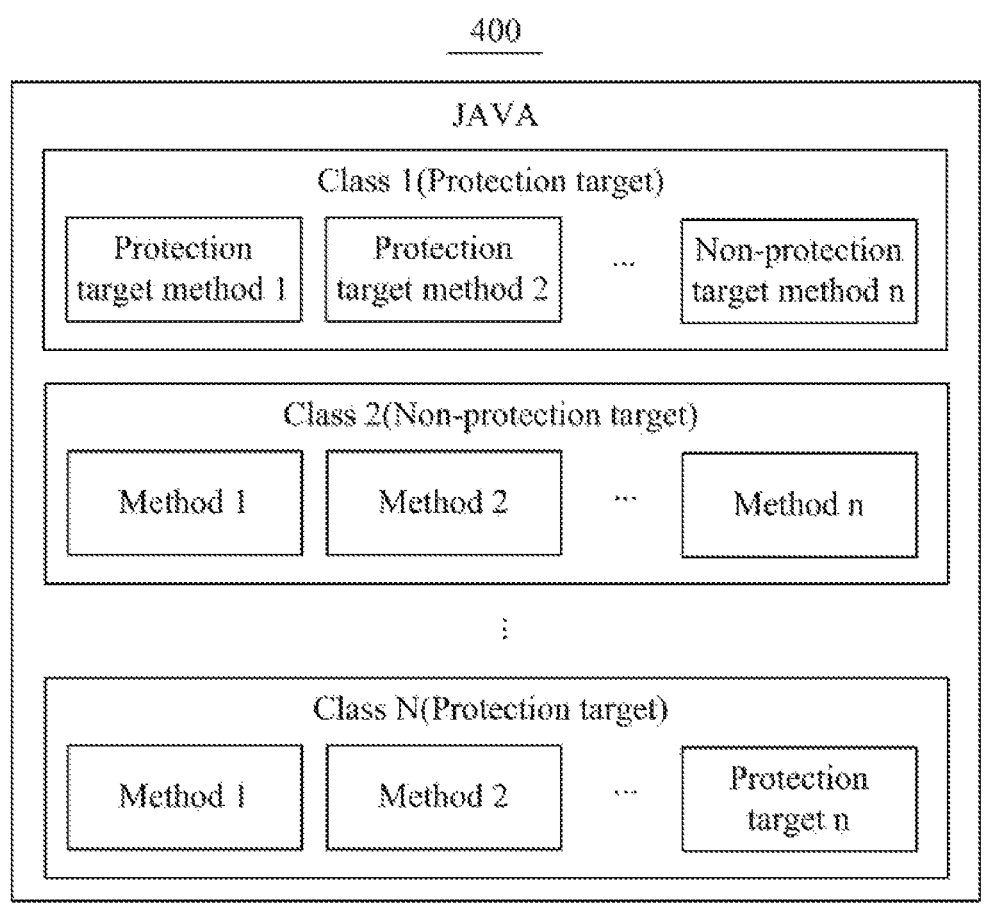
FIG. 4 illustrates an example of displaying classes and methods selected as protection targets from among classes and methods included in a dex file according to at least one example embodiment.
Figure 5:
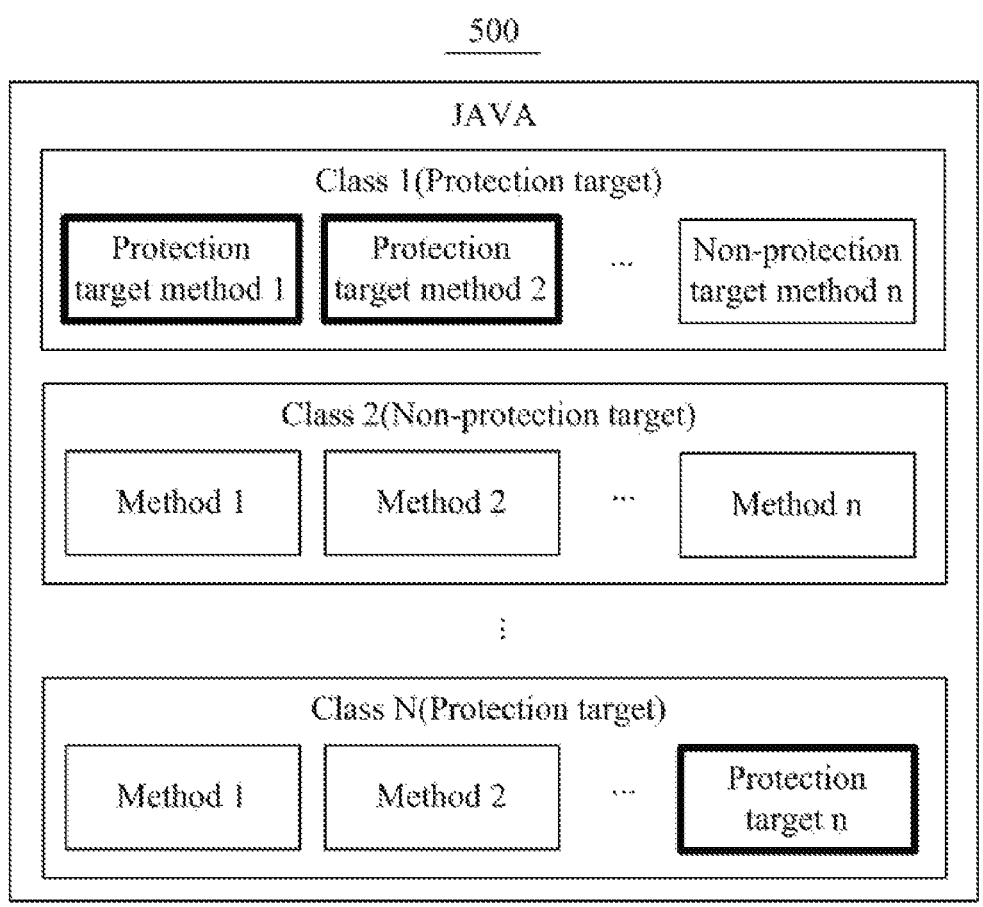
FIG. 5 illustrates an example of displaying encryption of classes and methods selected as protection targets according to at least one example embodiment.

FIG. 3 illustrates an example of a format of a dex file including classes and methods according to at least one example embodiment, FIG. 4 illustrates an example of displaying classes and methods selected as protection targets from among classes and methods included in a dex file according to at least one example embodiment, and FIG. 5 illustrates an example of displaying encryption of classes and methods selected as protection targets according to at least one example embodiment.

Referring to FIG. 3, a dex file 300 may include N classes and n methods for each class, but the example embodiments are not limited thereto. For example, while the example embodiments refer to the Java programming language and/or elements of the Android operating system, the example embodiments are not limited thereto and may be implemented using other programming languages, such as Basic, C, C++, C #, Objective C, Python, Perl, Lisp, Javascript, Fortran, COBOL, HDL, SQL, etc., and/or operating systems/runtime execution environments, such as iOS, Windows, MacOS, Linux, Unix, etc. Referring back to FIG. 3, each of N and n denotes a natural number. Although FIG. 3 illustrates an example in which n methods are includes for each class, a number of methods includable for each class may vary for each class. The dex file 300 may be included in an Android application package (APK) developed by developers and may be transmitted and registered to a system, such as the server 150, for code protection. For example, the server 150 may provide an APK registration service to users, for example, users desiring to register the APK, such as a developer, through, for example, a webpage, an application, etc. In detail, a user interface capable of registering the APK may be provided to a user that accesses a webpage provided from the server 150 using the electronic device 120, through the webpage.

Here, the server 150 may extract the dex file 300, such as a 'classes.dex' file from the APK uploaded through the webpage and may select a class and/or a method to be protected.

A dex file 400 of FIG. 4 shows a protection target class, a non-protection target class, a protection target method, and a non-protection target method in the dex file 300 of FIG. 3, however the example embodiments are not limited thereto. In FIG. 4, the protection target class and/or the protection target method is not actually generated. For clarity of description, FIG. 4 illustrates an example in which corresponding classes and/or methods are selected as protection targets. Although a class (and/or metaclasses, superclass, subclass, objects, templates, constructors, databases, etc.) is a protection target, all of the methods (and/or functions, subroutines, instances, structures, data structures, tables, etc.) included in the class may not be a protection target. In other words, one or more methods, or a subset of methods, included in a protection target class may be a protection target(s). For example, refer to class 1 and class N. That is, an actual protection target may be a method unit. As another example, if a class is a protection target, all or some of the methods included in the class may be configured to be selected as protection targets.

The protection target class and/or the protection target method may be selected based on an input from a user. For example, a webpage provided to the user may include a user interface that allows the user to input or select a class and/or a method to be protected. Once information associated with the class or the method to be protected is input through the webpage, the server 150 may verify the class and/or the method to be protected as shown in the dex file 400. Information input from the user may be a prefix of the class and/or the method, a class domain, and/or a name of the class or the method.

According to another example embodiment, the server 150 may directly select a class and/or a method of a desired and/or preset function. For example, the server 150 may retrieve and select a class and/or methods corresponding to a billing function at a service provided to users through the application, an authentication function at the service, a communication function with a server, for example, the server 160, providing the service, and the like. To this end, the server 150 may verify a list of classes or methods through a function, such as an API call for a developer system, may retrieve a class or a method from the list of classes or methods, and may select the class or the method as a protection target class and/or a protection target method.

As described above, the dex file 400 may include compiled bytecode, for example, IL code, and the server 150 may retrieve bytecode corresponding to the selected class and method. For example, a total number of classes and an offset (e.g., an address offset) of a class table may be stored in a header of the dex file 400, and an offset of a method table may be stored in each class. Accordingly, the server 150 may retrieve a desired bytecode in order of a class, a method, and/or a bytecode using the class table and the method table to retrieve a specific bytecode from the dex file 400.

A dex file 500 of FIG. 5 is an example in which methods selected as protection targets in the dex file 400 of FIG. 4 are encrypted. Once bytecodes of selected methods are obfuscated through encryption, information (hereinafter, 'decryption information') for decrypting the encrypted bytecodes may be added to the APK. For example, decryption information may be recorded in a native module, for example, a secure module that is written with extension ".so" and included in the APK with an execution code and distributed. The decryption information may vary based on a runtime scheme, for example, Dalvik runtime and Android runtime (ART), Objective C, Java Virtual Machine, etc., on an electronic device, for example, the electronic device 110, on which the application is executed. Since a plurality of methods may be encrypted, decryption information may be recorded in a form of an array for each method that is a protection target, but the example embodiments are not limited thereto.

For example, in Android, a dex file may be executed at Dalvik runtime on a Dalvik machine, for example, virtual machine, or an OAT file may be executed at ART on an ART machine. The Dalvik machine converts an application code to a native machine language code and executes code through a just-in-time (JIT) compilation of going through the conversion procedure every time the user executes the application (e.g., compiling and/or interpreting classes and/or methods, etc., of the application that are called and/or used by the application into machine code at run-time, etc.). The ART machine may convert the dex file to the OAT file using a converter called 'dex2oat' and may execute the converted OAT file. That is, when installing the application, the ART machine converts the application to a native application and installs the converted native application through an ahead of-time (AOT) compilation (e.g., compiling all of the classes and/or methods, etc., of the application into machine code prior to run-time and/or execution, etc.).

Accordingly, in the case of using the ART, a new virtual machine, for example, the aforementioned Dalvik machine, may be generated every time the application is executed and an execution time of an interpreted code may be removed. Accordingly, a different piece of decryption information may need to be transferred based on a different runtime scheme. In this case, decryption information for two runtime schemes may be recorded in the native module so that the APK provided from the server 150 may be executed using the two runtime schemes. An APK for Dalvik runtime and an APK for ART may be separately generated and an appropriate APK may be transmitted based on a corresponding electronic device.

Initially, decryption information for the Dalvik runtime may include an offset of a bytecode corresponding to a protection target method (substantially, an offset of an encrypted bytecode), a size (bytes) of the corresponding bytecode, a size (bytes) of the encrypted bytecode, and/or a key used for encryption, but is not limited thereto.

Also, decryption information for the ART may include a class index (information regarding which class and/or identifying the class) including the protection target method (e.g., encrypted method) and a method index (information regarding which method in a corresponding class and/or identifying a method of the class) of the corresponding protection target method. A dex file including a protection target class and a protection target method before encryption may be recorded in the native module.

In addition, since a cyclic redundancy check (CRC) and/or a hash value of the dex file that were previously computed using the original application are changed due to encryption of the method, the server 150 may recalculate the changed CRC and/or hash value using the encrypted code and may update the CRC and/or the hash value of the dex file.

The APK that includes the dex file in which the protection target method is encrypted may be transmitted to and installed on an electronic device, for example, the electronic device 110.

For example, on the Dalvik runtime, the electronic device may retrieve a dex header by parsing an odex header from the dex file, for example, 'classes.dex', loaded to the memory using, for example, a JNI_Onload function. Here, the dex file loaded to the memory may be an odex file present in a Dalvik-cache, and most bytecodes excluding bytecodes of a portion of classes are interpreted at a point in time at which a corresponding code is actually executed (e.g., at run-time), but the example embodiments are not limited thereto. In this case, the electronic device may decrypt data followed by the dex header based on the decryption information. For example, the electronic device may decrypt encrypted bytecodes by decrypting a size of a corresponding encrypted bytecode from an offset of a corresponding method using a key recorded on the native module based on decryption information recorded on the native module in a form of an array, etc., for each protection target method, and by overwriting the decrypted bytecode at a corresponding location.

Also, on the ART, the electronic device may secure native codes of the protection target class and the protection target method by executing a 'dex2oat' instruction, that is, an instruction for converting codes of the protection target class and the protection target method to native codes, by using, as a factor, the dex file recorded on the native module. For example, the dex file may include the protection target class and the protection target method before encryption, but is not limited thereto. As described above, on the ART, code of an application may be converted to a native code through an AOT compilation and thereby installed when installing the application, but is not limited thereto. On the ART, the electronic device may retrieve the dex file, for example, 'classes.dex', loaded to the memory using the JNI_Onload function. Here, since the dex file loaded to the memory substantially has an OAT file format, code may not be acquired using a general scheme, for example, a scheme using a dlopen function, etc. Accordingly, the electronic device may retrieve an OAT header and may retrieve, from the OAT header, a desired native code through a method index and class index included in decryption information. For example, the OAT header may be retrieved using an address (indicating an OAT header) of an OAT data symbol (oatdata symbol) and an address of an OAT execution symbol (oatexec symbol) acquired using a function, for example, a dlsym function, etc., of returning an address of a desired function. The electronic device may process decryption by overwriting the native codes of the protection target class and the protection target method on the native codes retrieved through the method index and the class index included in the decryption information. In detail, the electronic device may retrieve an OAT class that is represented by the OAT header and at the same time, corresponds to the class index and may retrieve the native code corresponding to the method index from the OAT class.

The Dalvik runtime and the ART are identical in that an encrypted code is decrypted at runtime and different in that an application is installed through a nativization process (a nativization process through compilation using a converter, such as dex2oat, etc.) of an original code on the ART. That is, a scheme of retrieving an encrypted code on the ART differs from that on the Dalvik runtime.

Figure 6:
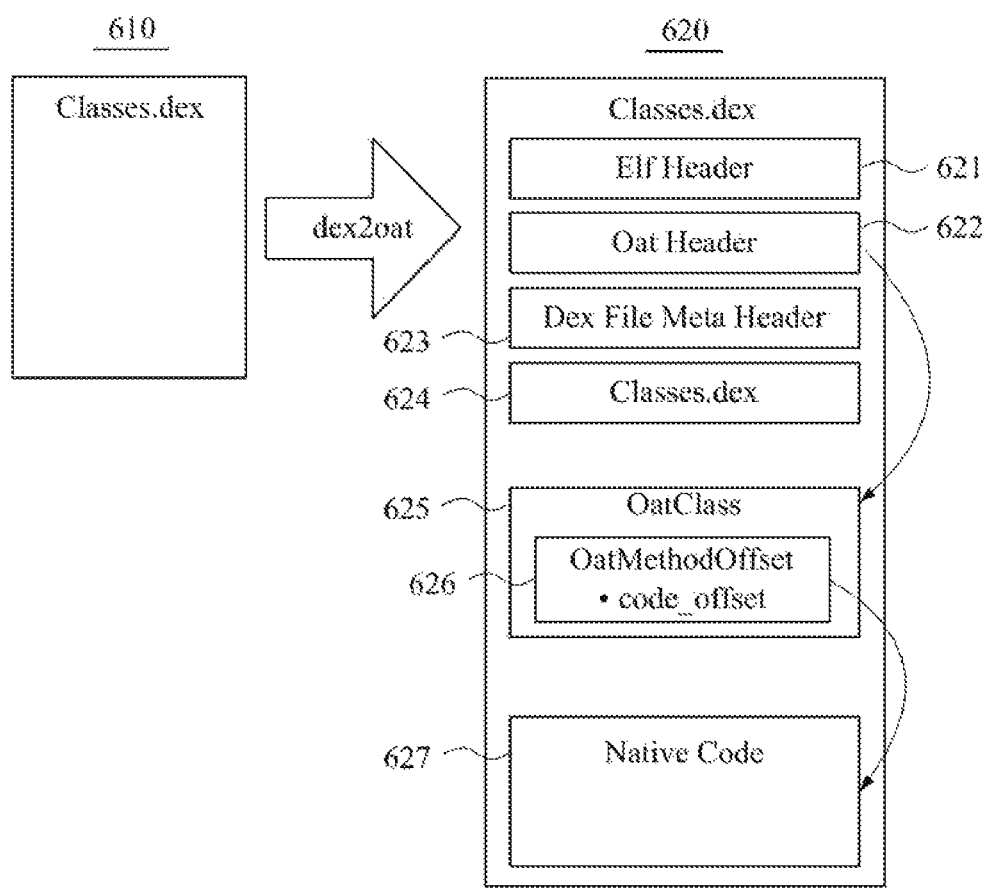
FIG. 6 illustrates an example of a process of retrieving an encrypted native code on Android runtime (ART) according to at least one example embodiment.

FIG. 6 illustrates an example of a process of retrieving an encrypted native code on ART according to at least one example embodiment. Referring to FIG. 6, Classes.dex 610 may represent a dex file included in an application program package provided to an electronic device. As described above, for example, on the ART, code included in the dex file may be converted to a native code using a converter, such as dex2oat, when installing an application. The dex file loaded to a memory of the electronic device may be, for example, substantially in an Elf share object (extension ".so") format, and may include an ELF header (Elf Header) 621 as shown in Classes.dex 620. Also, as described above, a format of the dex file may be converted to an OAT file format and may include an OAT header (Oat Header) 622. Also, the Classes.dex 620 may include a dex file meta header (Dex File Meta Header) 623 and Classes.dex 624. The Classes.dex 624 may correspond to the Classes.dex 610 that is the dex file before conversion. The Dex File Meta Header 623 may include meta information associated with the Classes.dex 624. The Oat Header 622 provides information capable of retrieving a desired OAT class (OatClass) 625 through a class index. Also, the OatClass 625 provides information (OatMethodOffset) 626 capable of retrieving code corresponding to a desired method from a native code 627 through a method index. As described above, the electronic device may acquire a normal native code by converting a dex file (including codes of a protection target class and a protection target method(s) before encryption) included in decryption information using a converter. In this case, the electronic device may decrypt the encrypted protection target method by retrieving code corresponding to the encrypted protection target method from the native code 627 and by replacing the retrieved code with the normal native code.

Figure 7:
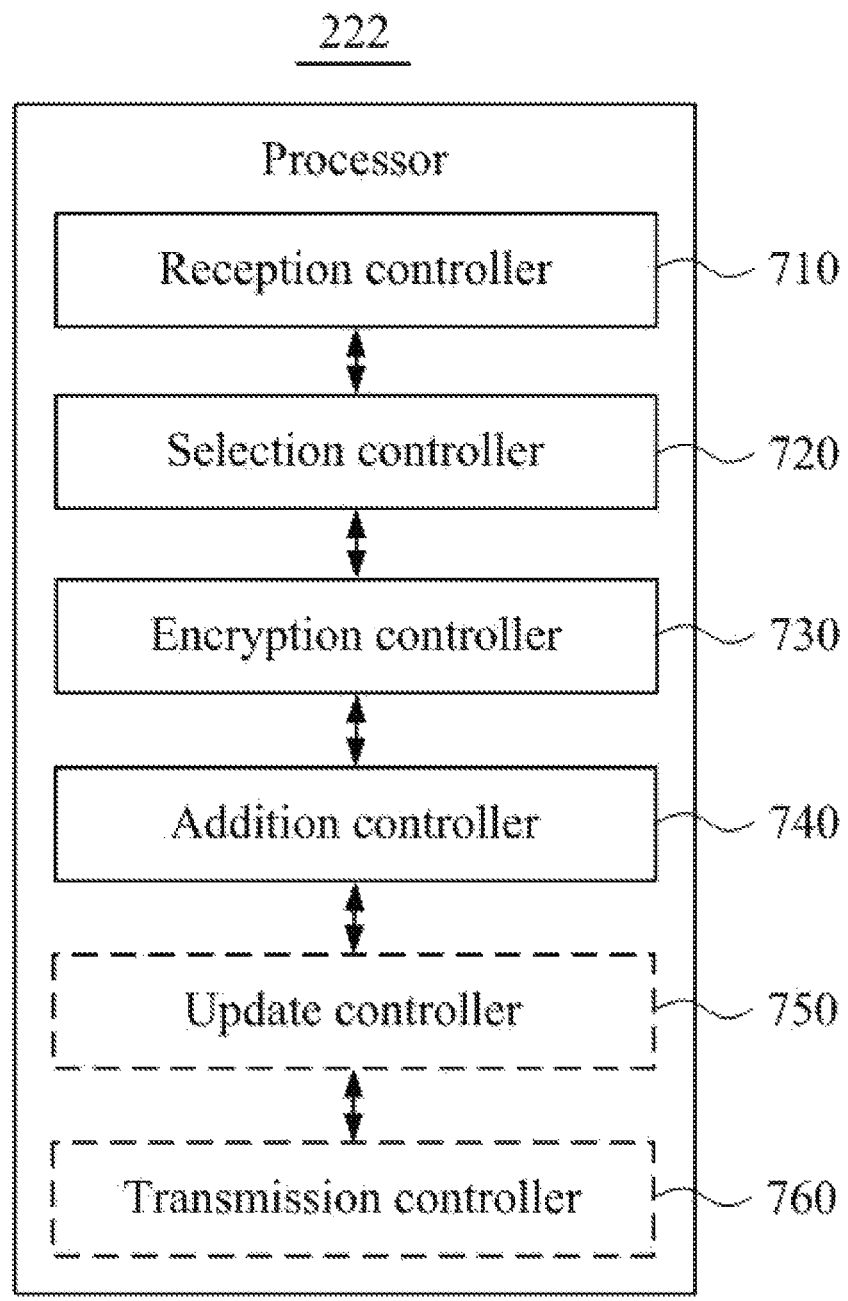
FIG. 7 is a block diagram illustrating an example of components includable in a processor of a server according to at least one example embodiment.
Figure 8:
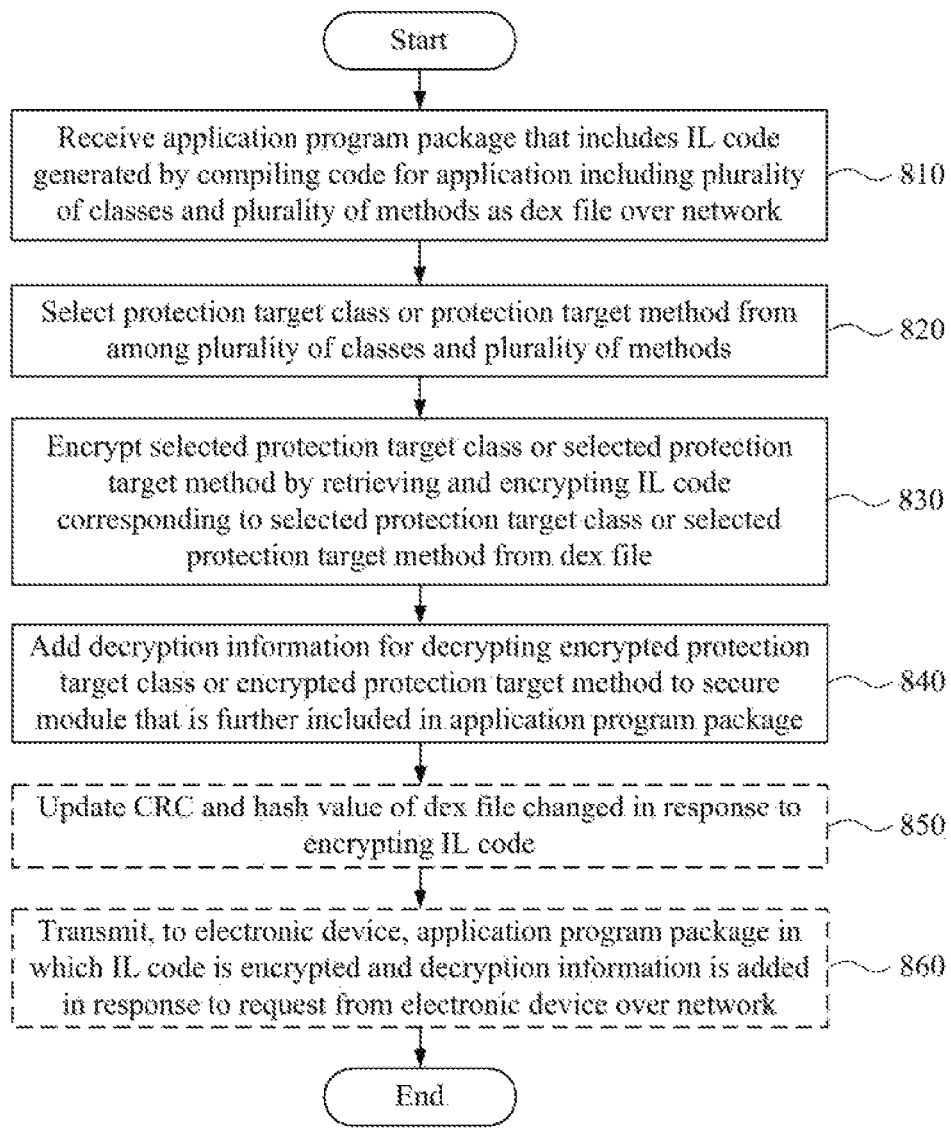
FIG. 8 is a flowchart illustrating an example of a method performed by a server according to at least one example embodiment.

FIG. 7 is a block diagram illustrating an example of components includable in at least one processor of a server according to at least one example embodiment, and FIG. 8 is a flowchart illustrating an example of a method performed by a server according to at least one example embodiment. Referring to FIG. 7, the at least one processor 222 of the server 150 may include a reception controller 710, a selection controller 720, an encryption controller 730, and/or an addition controller 740, etc., and may selectively further include an update controller 750 and/or a transmission controller 760, but the example embodiments are not limited thereto. Components of the at least one processor 222 may control the server 150 to perform operations 810 through 860 included in the method of FIG. 8, and may be configured to operate through at least one program code and an OS included in the memory 221 to perform the above control. Operations 850 and 860 may be selectively included in the method of FIG. 8 depending on example embodiments.

In operation 810, the server 150 may receive an application program package that includes an IL code generated by compiling code for an application including a plurality of classes and a plurality of methods as a dex file over a network. For example, a dex file that includes a bytecode as an IL code generated by compiling code written in Java may be included in the application program package, but the example embodiments are not limited thereto. The reception controller 710 may control the server 150 to perform operation 810.

Here, the server 150 may be a system that receives and protects an application program package for a developed application. The server 150 may be a system of a developer of an application, may be a system of a third party that receives and protects the application program package from the developer, may be a file distribution system that receives the application program package of the developer and distributes the received application program package to users, etc.

In operation 820, the server 150 may select a protection target class or a protection target method from among the plurality of classes and the plurality of methods. The selection controller 720 may control the server 150 to perform operation 820. The protection target class and/or the protection target method may be selected based on information input from a user, for example, the developer of the application, and/or may be selected by the server 150.

According to at least one example embodiment, the server 150 may further receive selection information for designating a class and/or a method over the network. In this case, the server 150 may select the class and/or the method designated using the selection information as the protection target class and/or the protection target method.

According to another example embodiment, in operation 820, the server 150 may select a class and/or a method corresponding to a desired and/or preset function of the application from among the plurality of classes and the plurality of methods and may select the retrieved class or the retrieved method as the protection target class and/or the protection target method. For example, the server 150 may automatically select, as the protection target class and/or the protection target method, a class and/or a method corresponding to at least one of a billing function at a service provided through the application, an authentication function at the service, and/or a communication function with a server, for example, the server 160, providing the service, etc., but the example embodiments are not limited thereto. In other words, the server 150 may analyze the code and select desired functions (e.g., classes, methods, API, code, etc.) directed towards system critical, confidential, financially sensitive, privacy-related, etc., software functions of the code for protection from hackers, snoopers, or the like.

In operation 830, the server 150 may encrypt the selected protection target class and/or the selected protection target method by retrieving and encrypting an IL code corresponding to the selected protection target class and/or the selected protection target method from the dex file. The encryption controller 730 may control the server 150 to perform operation 830.

For example, the dex file may include a header that stores a number of the plurality of classes (e.g., a count of how many classes are included in the plurality of classes and/or a quantity of the total number of classes, etc.) and an offset (e.g., an address offset, a memory offset, etc.) of a class table, and each of the plurality of classes may include an offset of a method table with respect to a method included in each of the plurality of classes. In this case, the server 150 may retrieve an IL code corresponding to the protection target class using the class table or retrieve an IL code corresponding to the protection target method using the method table, and may encrypt the retrieved IL code.

In operation 840, the server 150 may add decryption information for decrypting the encrypted protection target class and/or the encrypted protection target method to a secure module that is further included in the application program package. The addition controller 740 may control the server 150 to perform operation 840.

A different piece of decryption information may be used based on a runtime scheme of an electronic device on which the application program package is to be installed. To this end, in operation 840, the server 150 may add the different piece of decryption information to the secure module of the application program package, or may generate a plurality of different application program packages each in which the difference piece of decryption information is added to the secure module. For example, the server 150 may add all of decryption information for Dalvik runtime and decryption information for ART to the secure module, but the example embodiments are not limited thereto. As another example, the server 150 may generate an application program package in which decryption information for the Dalvik runtime is added to the secure module and an application program package in which decryption information for the ART is added to the secure module.

According to at least one example embodiment, the decryption information may include information associated with an offset of the encrypted IL code, a size of the encrypted IL code, and a key used for encryption for a case in which an electronic device executes the application using the Dalvik runtime. In this case, the encrypted protection target method may be decrypted at the electronic device by decrypting code corresponding to a size of the encrypted IL code from the offset of the encrypted IL code from a dex header of the dex file loaded to a memory of the electronic device using the key and by overwriting the decrypted code on the dex header.

According to another example embodiment, the decryption information may include the dex file including (1) a class including the encrypted protection target method and/or a class index of the encrypted protection target method, (2) a method index of the encrypted protection target method, and/or (3) the protection target class (class before encryption) and/or the protection target method (method before encryption) for a case in which the electronic device executes the ART, but the example embodiments are not limited thereto. In this case, the encrypted protection target method may be decrypted at the electronic device by compiling the dex file included as the decryption information using a converter, by acquiring a native code of the protection target class (class before encryption) and/or the protection target method (method before encryption), by retrieving an encrypted IL code using the class index and the method index from a header of the dex file loaded to a memory of the electronic device, and/or by overwriting a native code corresponding to the encrypted IL code among the acquired native codes on the retrieved encrypted IL code.

In operation 850, the server 150 may update a CRC and/or a hash value (e.g., a file integrity or verification check, etc.) of the dex file changed in response to encrypting the IL code. The update controller 750 may control the server 150 to perform operation 850. If the dex file of the application program package initially transmitted to the server 150 includes the CRC and/or the hash value, the CRC and/or the hash value need to be updated in response to encryption of the IL code. Accordingly, the server 150 may calculate a CRC and/or a hash value of the changed dex file and may update the same.

In operation 860, the server 150 may transmit, to the electronic device, the application program package in which the IL code is encrypted and the decryption information is added in response to a request from the electronic device over the network. The transmission controller 760 may control the server 150 to perform operation 860. If the server 150 is a file distribution system that distributes the APK to the user, the server 150 may perform operation 860. If the server 150 is a separate system for protecting the APK, the server 150 may provide the protected APK to the file distribution system and/or may retransmit the protected APK to the user, for example, the developer, etc.

Figure 9:
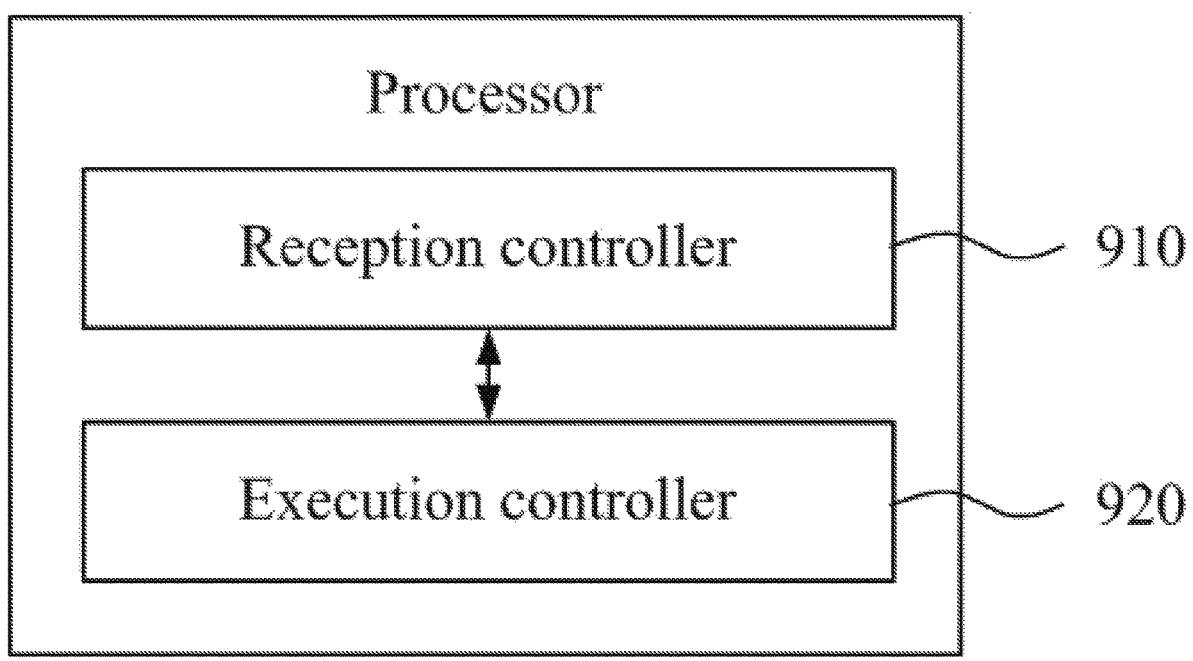
FIG. 9 is a block diagram illustrating an example of components includable in a processor of an electronic device according to at least one example embodiment.
Figure 10:
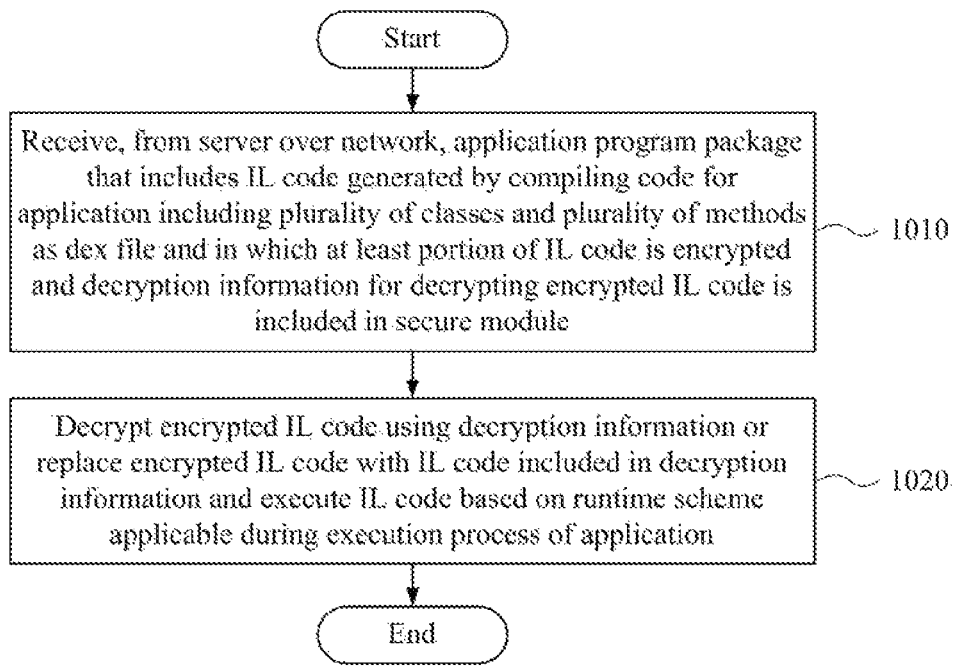
FIG. 10 is a flowchart illustrating an example of a method performed by an electronic device according to at least one example embodiment.

FIG. 9 is a block diagram illustrating an example of components includable in at least one processor of an electronic device according to at least one example embodiment, and FIG. 10 is a flowchart illustrating an example of a method performed by an electronic device according to at least one example embodiment. Referring to FIG. 9, the at least one processor 212 of the electronic device 110 may include a reception controller 910 and/or an execution controller 920, but is not limited thereto. Components of the at least one processor 212 may control the electronic device 110 to perform operations 1010 and 1020 included in the method of FIG. 10, and may be configured to operate through at least one program code and an OS included in the memory 211. Here, the at least one program code may be a portion of code included in an application program package received by the electronic device 110 in operation 1010 to process operation 1020.

Referring to FIG. 10, in operation 1010, the electronic device 110 may receive, from the server 150 over a network, an application program package that includes an IL code generated by compiling code for an application including a plurality of classes and a plurality of methods as a dex file, and in which at least a portion of the IL code is encrypted, and decryption information for decrypting the encrypted IL code is included in a secure module. The reception controller 910 may control the electronic device 110 to perform operation 1010. Also, the encrypted IL code may be generated by encrypting an IL code of a protection target class and/or a protection target method selected at the server 150 from among the plurality of classes and the plurality of methods.

In operation 1020, the electronic device 110 may decrypt the encrypted IL code using the decryption information and/or may replace the encrypted IL code with an IL code included in the decryption information, and may execute the IL code based on a runtime scheme applicable during an execution process of the application. The execution controller 920 may control the electronic device 110 to perform operation 1020.

As described above, the decryption information may include information associated with an offset of the encrypted IL code, a size of the encrypted IL code, and/or a key used for encryption, etc., for Dalvik runtime. In this case, in operation 1020, when the Dalvik runtime proceeds, the electronic device 110 may decrypt the protection target method by decrypting code corresponding to a size of the encrypted IL code from the offset of the encrypted IL code from a dex header of the dex file loaded to a memory using the key and by overwriting the decrypted code on the dex header.

Also, the decryption information may include the dex file including (1) a class including the encrypted protection target method and/or a class index of the encrypted protection target method, (2) a method index of the encrypted protection target method, and/or (3) the protection target class or the protection target method for ART, etc. In this case, in operation 1020, when the ART proceeds, the electronic device 110 may decrypt the protection target method by compiling the dex file included as the decryption information using a converter, by acquiring a native code of the protection target class or the protection target method, by retrieving the encrypted IL code using the class index and the method index from a header of the dex file loaded to the memory, and/or by overwriting a native code corresponding to the encrypted IL code among the acquired native codes on the retrieved encrypted IL code.

A detailed description is made above and thus, a further description is omitted here.

According to some example embodiments, it is possible to reduce and/prevent forgery of an application through decompiling by selecting and encrypting code corresponding to a primary class and/or method from among codes of the application and by decrypting the encrypted code at runtime.

The systems and or apparatuses described herein may be implemented using hardware components and/or a combination of hardware components and software components. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM, random access memory (RAM, flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments, or vice versa.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method executed on at least one computer, the method comprising:
    receiving, using at least one processor, an application program package over a network, the application program package including intermediate language (IL) code generated by compiling code for an application as a dex file, the application including a plurality of classes and a plurality of methods;
    selecting, using the at least one processor, at least one protection target class or at least one protection target method from the plurality of classes and the plurality of methods, the selecting the at least one protection target class or at least one protection target method including selecting a subset of the classes or methods of the plurality of classes and the plurality of methods included in the application;
    encrypting, using the at least one processor, the selected protection target class or the selected protection target method, the encrypting including retrieving and encrypting IL code corresponding to the selected protection target class or the selected protection target method from the dex file; and
    adding, using the at least one processor, decryption information to a secure module that is further included in the application program package, the decryption information for decrypting the encrypted protection target class or the encrypted protection target method, wherein the decryption information includes the dex file, and the dex file includes (1) a class including the encrypted protection target method or a class index of the encrypted protection target method, (2) a method index of the encrypted protection target method, and (3) the protection target class or the protection target method for a case in which an electronic device executes the application using Android runtime (ART).

2. The method of claim 1, wherein
    the receiving includes receiving selection information for designating a class or a method over the network; and
    the selecting comprises selecting the class or the method designated using the received selection information as the protection target class or the protection target method.

3. The method of claim 1, wherein the selecting comprises:
    retrieving a class or a method corresponding to a desired function of the application from among the plurality of classes and the plurality of methods; and
    selecting the retrieved class or the retrieved method as the protection target class or the protection target method.

4. The method of claim 3, wherein the desired function includes at least one of:
    a billing function at a service provided through the application,
    an authentication function at the service, and
    a communication function with a server providing the service.

5. The method of claim 1, wherein
    the dex file includes a header that stores a number indicating a total number of classes included in the plurality of classes, and an offset of a class table; and
    each of the classes of the plurality of classes includes an address offset of a method table with respect to a method included in each of the classes of the plurality of classes; and
    the encrypting comprises retrieving IL code corresponding to the protection target class using the class table, or retrieving IL code corresponding to the protection target method using the method table.

6. The method of claim 1, further comprising:
    selecting, using the at least one processor, the decryption information based on a runtime scheme at an electronic device on which the application program package is to be installed; and
    the adding comprises,
        adding the decryption information to the secure module of the application program package, or
        generating a plurality of different application program packages using different pieces of decryption information, each of the different pieces of decryption information corresponding to a plurality of runtime schemes, and
        adding each of the different pieces of decryption information to a corresponding secure module of the generated plurality of different application program packages.

7. The method of claim 1, wherein the decryption information further includes information associated with an address offset of the encrypted IL code, a size of the encrypted IL code, and a key used for encryption for a case in which an electronic device executes the application using Dalvik runtime.

8. The method of claim 7, wherein the encrypted protection target method is decrypted at the electronic device by:
loading the encrypted IL code included in the dex file to a memory of the electronic device;
locating the encrypted protection target method in the encrypted IL code based on the address offset of the encrypted IL code included in a dex header of the dex file;
decrypting code corresponding to a size of the encrypted IL code corresponding to the encrypted protection target method using the key; and
overwriting the decrypted code on the dex header.

9. The method of claim 1, wherein the encrypted protection target method is decrypted at the electronic device by:
compiling the dex file included in the decryption information using a converter;
acquiring a native code of the protection target class or the protection target method;
retrieving the encrypted IL code using the class index and the method index from a header of the dex file loaded to a memory of the electronic device; and
overwriting a native code corresponding to the encrypted IL code among the acquired native codes on the retrieved encrypted IL code.

10. The method of claim 1, further comprising:
updating using the at least one processor, a cyclic redundancy check (CRC) and a hash value of the dex file changed in response to encrypting the IL code.

11. The method of claim 1, further comprising:
transmitting, using the at least one processor, to an electronic device the application program package in which the IL code is encrypted and the decryption information is added in response to a request from the electronic device over the network.

12. A method executed using at least one computer, the method comprising:
receiving, using at least one processor, from a server over a network, an application program package that includes intermediate language (IL) code generated by compiling code for an application as a dex file and decryption information included in a secure module, the IL code including a plurality of classes and a plurality of methods and in which at least a portion of the IL code is encrypted, and the decrypted information is for decrypting the encrypted IL code;
decrypting, using the at least one processor, the encrypted IL code using the decryption information or by replacing the encrypted IL code with an IL code included in the decryption information; and
executing the decrypted IL code based on a runtime scheme applicable during an execution process of the application, wherein
the encrypted IL code is generated by encrypting an IL code of at least one protection target class or at least one protection target method selected at the server from among the plurality of classes and the plurality of methods of the application, the at least one protection target class or at least one protection target method being a subset of the classes or methods of the plurality of classes and the plurality of methods included in the application, and
the decryption information includes the dex file, and the dex file includes (1) a class including the encrypted protection target method or a class index of the encrypted protection target method, (2) a method index of the encrypted protection target method, and (3) the protection target class or the protection target method for a case in which an electronic device executes the application using Android runtime (ART).

13. The method of claim 12, wherein the decryption information further includes information associated with an address offset of the encrypted IL code, a size of the encrypted IL code, and a key used for encryption, for Dalvik runtime.

14. The method of claim 13, wherein the executing comprise:
loading the encrypted IL code included in the dex file to a memory;
locating the encrypted protection target method in the encrypted IL code based on the address offset of the encrypted IL code included in a dex header of the dex file;
decrypting the protection target method using the key; and
overwriting the decrypted code on the dex header.

15. The method of claim 12, wherein the executing comprises decrypting the protection target method by:
compiling the dex file included in the decryption information using a converter;
acquiring a native code of the protection target class or the protection target method;
retrieving the encrypted IL code using the class index and the method index from a header of the dex file loaded to a memory; and
overwriting a native code corresponding to the encrypted IL code among the acquired native codes on the retrieved encrypted IL code.

16. A system of at least one server comprising one or more processors, wherein each of the one or more processors is configured to execute computer readable instructions to:
receive an application program package over a network, the application program package including intermediate language (IL) code generated by compiling code for an application as a dex file, the application including a plurality of classes and a plurality of methods;
select at least one protection target class or at least one protection target method from the plurality of classes and the plurality of methods, the selecting the at least one protection target class or at least one protection target method including selecting a subset of the classes or methods of the plurality of classes and the plurality of methods included in the application;
encrypt the selected protection target class or the selected protection target method, the encrypting including retrieving and encrypting IL code corresponding to the selected protection target class or the selected protection target method from the dex file; and
add decryption information to a secure module that is further included in the application program package, the decryption information for decrypting the encrypted protection target class or the encrypted protection target method, wherein the decryption information includes the dex file, and the dex file includes (1) a class including the encrypted protection target method or a class index of the encrypted protection target method, (2) a method index of the encrypted protection target method, and (3) the protection target class or the protection target method for a case in which an electronic device executes the application using Android runtime (ART).

17. The system of claim 16, wherein each of the one or more processors are configured to:
receive selection information for designating a class or a method over the network; and select the class or the method designated using the received selection information as the protection target class or the protection target method.

18. The system of claim 16, wherein each of the one or more processors are configured to:
retrieve a class or a method corresponding to a desired function of the application from among the plurality of classes and the plurality of methods; and
select the retrieved class or the retrieved method as the protection target class or the protection target method.

19. The system of claim 16, wherein each of the one or more processors are further configured to:
select the decryption information based on a runtime scheme at an electronic device on which the application program package is to be installed; and
add the selected decryption information to the secure module of the application program package, or
generate a plurality of different application program packages using different pieces of decryption information, each of the different pieces of decryption information corresponding to a plurality of runtime schemes, and
add each of the different pieces of decryption information to a corresponding secure module of the generated plurality of different application program packages.

* * * * *